United States Patent [19]

Matsubara et al.

[11] Patent Number: 5,189,716
[45] Date of Patent: Feb. 23, 1993

[54] PHOTOSEMICONDUCTOR AND OPTICAL FIBER WELDED MODULE

[75] Inventors: Takahiro Matsubara; Yoshio Makita; Koichiro Iwao, all of Osaka, Japan

[73] Assignee: Nippon Sheet Glass Co., Ltd., Osaka, Japan

[21] Appl. No.: 846,338

[22] Filed: Mar. 6, 1992

Related U.S. Application Data

[63] Continuation-in-part of Ser. No. 647,035, Jan. 29, 1991, Pat. No. 5,119,462.

[30] Foreign Application Priority Data

Jan. 29, 1990 [JP] Japan ................................. 2-18718
Mar. 22, 1990 [JP] Japan ................................. 2-72591

[51] Int. Cl.⁵ .................................. G02B 6/26; H01J 5/16
[52] U.S. Cl. ........................................... 385/93; 385/34; 385/90; 385/91; 250/227.11
[58] Field of Search ..................... 385/33, 34, 88, 90, 385/91, 92, 93, 49; 250/227.11; 219/121.6, 121.63

[56] References Cited

U.S. PATENT DOCUMENTS

| | | | |
|---|---|---|---|
| 4,709,979 | 12/1987 | Spodati | 385/88 X |
| 4,714,315 | 12/1987 | Krause | 385/96 |
| 4,728,787 | 3/1988 | Henry et al. | 250/227.11 |
| 4,836,635 | 6/1989 | De Amorim | 385/33 X |
| 4,927,228 | 5/1990 | Van De Pas | 385/90 |
| 4,969,702 | 11/1990 | Anderson | 385/33 |
| 4,988,159 | 1/1991 | Turner et al. | 385/78 X |
| 4,995,687 | 2/1991 | Nagai et al. | 357/17 X |
| 5,009,481 | 4/1991 | Kinoshita et al. | 385/33 |
| 5,050,953 | 9/1991 | Anderson et al. | 385/89 |
| 5,119,462 | 6/1992 | Matsubara et al. | 385/93 |

FOREIGN PATENT DOCUMENTS 63-128748  8/1988  Japan ................................. 385/33 X Primary Examiner—Brian Healy
Attorney, Agent, or Firm—Dickstein, Shapiro & Morin

[57] ABSTRACT

A photosemiconductor module such as a laser diode module or a photodiode module is optically coupled to an optical fiber. The photosemiconductor module includes a holder assembly with a photosemiconductor and a lens being fixedly mounted therein coaxially along an optical axis. An optical connector is joined to the holder assembly and has a hollow receptacle to be connected to the optical fiber and a joint press-fitted in the receptacle and joined coaxially to the holder assembly by lap laser beam welding.

8 Claims, 5 Drawing Sheets

PHOTOSEMICONDUCTOR AND OPTICAL FIBER WELDED MODULE

This application is a continuation-in-part application of U.S. patent application Ser. No. 07/647,035, Jan. 29, 1991 now U.S. Pat. No. 5,119,462.

BACKGROUND OF THE INVENTION

1. Field of the Invention

The present invention relates to a photosemiconductor module capable of emitting light or detecting the intensity of received light, for use in optical communications.

2. Description of the Prior Art

Photosemiconductor modules are used to obtain a predetermined coupled condition between a photosemiconductor and an optical fiber for achieving a desired intensity of light transmitted between the photosemiconductor and the optical fiber. Generally, the photosemiconductor modules include a lens to be disposed between the photosemiconductor and the optical fiber to adjust the coupled condition.

One conventional photosemiconductor module is shown in FIG. 6 of the accompanying drawings. The photosemiconductor module includes a photosemiconductor 100 and a lens 101 which are fixed in position by an adhesive or the like in an integral holder 102 made of brass or the like. The holder 102 is joined by a solder 104 or laser welding to an optical connector 103 which includes a receptacle of brass or the like that is to be connected to a plug (not shown) coupled to an optical fiber.

Another known photosemiconductor module includes separate holders for a photosemiconductor and a lens, as disclosed in Japanese Laid-Open Utility Model Publication No. 63(1988)-128748, for example.

The photosemiconductor modules are however incapable of adjusting the lens along an optical axis thereof (i.e., in the direction of the Z-axis). Therefore, elaborate and detailed design configurations are necessary to fix the photosemiconductor and the lens to the holder or holders since the photosemiconductor and the lens cannot be relatively adjusted in position along the optical axis while the optically coupled condition is being monitored when these photosemiconductors are assembled.

The optical connector 103 shown in FIG. 6 is of a unitary structure. In order to join the holder 102 and the optical connector 103 to each other by the solder 104 or laser beam welding, the optical connector 103 has to be machined highly accurately from a mass of hard metal which is not easy to cut.

The holder 102 and the optical connector 103 are held in abutment against each other. When the holder 102 and the optical connector 103 are welded to each other by a laser beam, it is required to slightly adjust the position where the laser beam is applied radially to the joint between the holder 102 and the optical connector 103, because the area in which the holder 102 and the optical connector 103 are welded together tends to vary depending on the position where the laser beam is applied. Consequently, the photosemiconductor modules cannot be assembled efficiently at a high production rate. The qualities, such as mechanical strength and distortion, of the photosemiconductor module reflect the condition in which the laser beam is applied.

The region where the holder 102 and the optical connector 103 is joined together is exposed to the exterior. Therefore, the joined region has poor environmental resistance against heat cycles, humidity, and other environmental factors. If the photosemiconductor and the lens are held in different holders, respectively, relative positional adjustments of the holders in directions normal to the optical axis (i.e., the directions of the x- and y-axes) result in irregularities in the outer profile of the photosemiconductor module. The outer profile of the photosemiconductor module is thus liable to have a poor coaxial configuration.

In the cases where the components of the photosemiconductor are assembled and secured together by adhesive bonding or soldering, the optical axis of the module will be slightly deflected in a heat-cycle load test or the like. Then, the photosemiconductor module cannot produce a stable optical output if the plug is connected to a single-mode fiber rather than a multimode fiber, and hence is not reliable enough in operation. The adhesive bonding process allows the components to be positionally displaced when the adhesive is heated and hardened, and also requires a certain period of time to elapse until the components are completely joined together. Accordingly, the assembling procedure is composed of an increased number of steps and is time-consuming. In addition, although the photosemiconductor module is relatively simple in construction, it cannot automatically be assembled because of the adhesive bonding process required.

SUMMARY OF THE INVENTION

In view of the aforesaid difficulties of the conventional photosemiconductor modules, it is an object of the present invention to provide a photosemiconductor module which is of high quality and reliability, can efficiently be manufactured because of a laser beam welding process employed, and is of such a structure which can easily be assembled automatically.

Another object of the present invention is to provide a photosemiconductor module which includes components that can positionally be adjusted in the directions of X-and Y-axes normal to the optical axis thereof and also in the direction of the optical axis, i.e., in the direction of a Z-axis.

According to the present invention, there is provided a photosemiconductor module for being optically coupled to an optical fiber, comprising a holder assembly, a photosemiconductor and a lens which are fixedly mounted in the holder assembly coaxially along an optical axis, and an optical connector joined to the holder assembly, the optical connector having a hollow receptacle adapted to be connected to the optical fiber and a joint press-fitted in the receptacle and joined coaxially to the holder assembly by lap laser beam welding.

The holder assembly may comprise a flange which is joined to the joint by a lap laser beam welding after the flange and the joint are positionally adjusted in a direction normal to the optical axis, a first hollow holder having a hollow portion in which the lens is coaxially fixedly mounted, and a second hollow holder in which the photosemiconductor is fixedly mounted, the first and second hollow holders being brought into interfitting engagement with each other after the first and second hollow holders are positionally adjusted along the optical axis.

Alternatively, the holder assembly may comprise a hollow holder in which the photosemiconductor and the lens are fixedly mounted coaxially, and a coupling in which the hollow holder is fitted, the coupling and the joint being joined to each other by laser beam welding.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
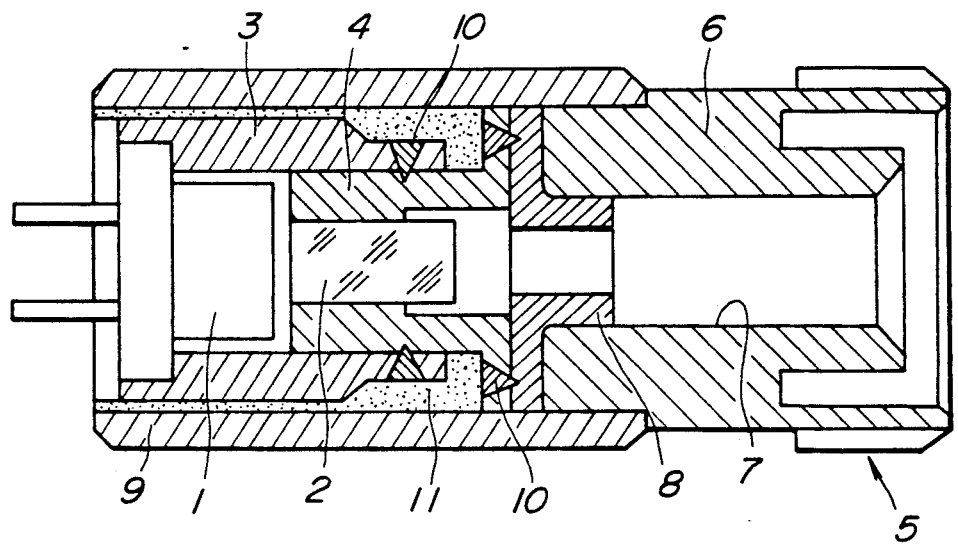
FIG. 1 is an axial cross-sectional view of a photosemiconductor module according to a first embodiment of the present invention.

FIG. 1 shows in cross section a photosemiconductor module according to a first embodiment of the present invention. The photosemiconductor module according to the first embodiment includes a light-emitting element such as a laser diode or the like.

As shown in FIG. 1, the photosemiconductor module comprises a photosemiconductor 1 fixedly supported in a photosemiconductor holder 3 and a lens 2 fixedly supported in a lens holder 4. The lens holder 4 is fitted in the photosemiconductor holder 3, and joined to the photosemiconductor holder 3 at regions 10 by a laser beam welding process effected from the side of the holder 3. The photosemiconductor module also has an optical connector 5 which includes a receptacle 6 defining a ferrule hole 7 therein. The lens holder 4 has a flange 4F (FIG. 2) held against or superposed on a joint 8 which is partly press-fitted in the ferrule hole 7. The flange 4F is joined to the joint 8 at regions 10 by a laser beam welding process effected from the side of the lens holder 4. The photosemiconductor holder 3, the lens holder 4, the joint 8, and a portion of the receptacle 6 are fitted in and covered with a sleeve 9. A filler 11 which may comprise an adhesive is disposed between the sleeve 9, the photosemiconductor holder 3, and the lens holder 4.

Figure 2:
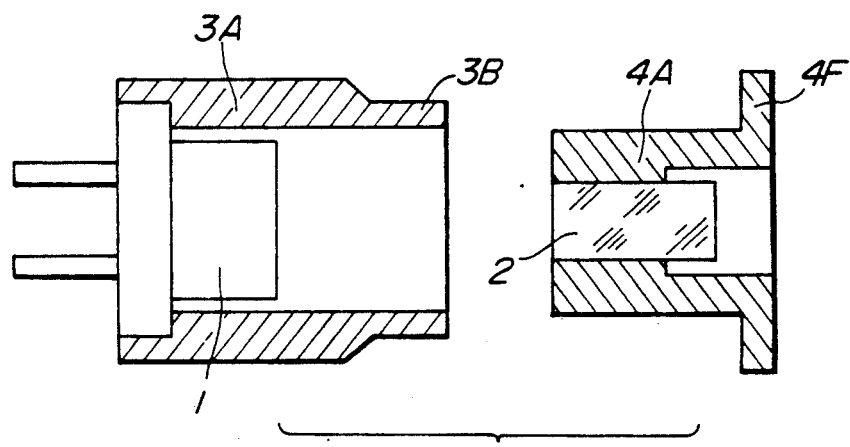
FIG. 2 is an axial cross-sectional view of a photosemiconductor holder and a lens holder of the photosemiconductor according to the first embodiment.

The photosemiconductor module of the above-construction is assembled as follows:

FIG. 2 shows the photosemiconductor holder 3 with the photosemiconductor 1 fixedly mounted therein and the lens holder 4 with the lens 2 fixedly mounted therein before the photosemiconductor holder 3 and the lens holder 4 are interfitted. As illustrated in FIG. 2, the photosemiconductor holder 3 comprises a hollow tubular member having a thicker tubular portion 3A and a thinner tubular portion 3B. The photosemiconductor 1 is positioned in the thicker tubular portion 3A. The lens holder 4 also comprises a hollow tubular member having a tubular portion 4A to be fitted in the photosemiconductor holder 3 and the flange 4F to be joined to the joint 8 by laser welding. The lens 2 is positioned in the tubular portion 4A.

The lens holder 4 is fitted into the photosemiconductor holder 3 and is positionally adjusted along the optical axis, i.e., in the direction of the Z-axis, while their coupled condition is being monitored. Then, the thinner tubular portion 3B of the photosemiconductor holder 3 and the tubular portion 4A of the lens holder 4 are joined to each other at the regions 10 by a laser beam welding process which is effected radially inwardly from the side of the thinner tubular portion 3B.

Figure 3:
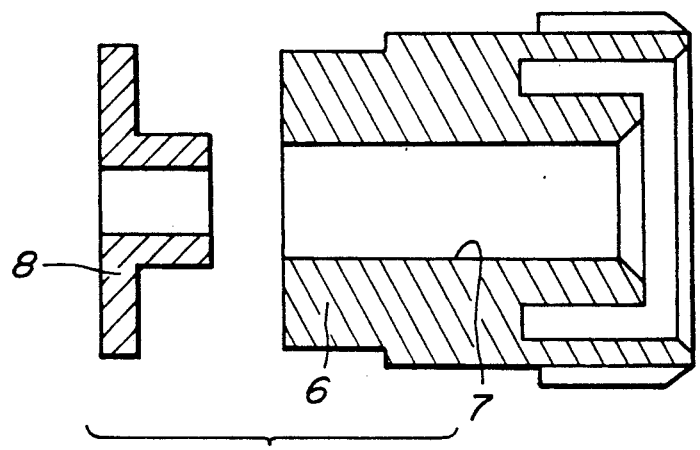
FIG. 3 is an axial cross-sectional view of a joint and a receptacle of the photosemiconductor module according to the first embodiment.

FIG. 3 shows the receptacle 6 and the joint 8 before the joint 8 is press-fitted into the receptacle 6. Generally, the receptacle 6 is complex in shape, and the ferrule hole 7 is required to be finished so that the diameter thereof is defined highly accurately. Therefore, the receptacle 6 is made of a material such as brass which can easily be machined with high precision. The joint 8 is made of a material such as stainless steel which can easily be joined by laser welding. The joint 8 and the receptacle 6 as they are press-interfitted make up the optical connector 5.

The flange 4F of the lens holder 4 to which the photosemiconductor holder 3 is joined is than held against and superposed on the joint 8, as shown in FIG. 1. While the coupled condition of the lens holder 4 and the joint 8, i.e., the intensity of light that is transmitted from the lens 2 to the joint 8, is being monitored, the lens holder 4 and the joint 8 are positionally adjusted in directions of X- and Y-axes normal to the optical axis. Then, the flange 4F and the joint 8 as they are superposed one on the other are joined to each other at the regions 10 by a lap laser beam welding process which is effected axially from the side of the lens holder 4 to the side of the joint 8.

In this manner, the components of the photosemiconductor module are positionally adjusted along the optical axis, i.e., in the direction of the Z-axis and also in the directions of the X- and Y-axes normal to the optical axis.

After the coupled condition is adjusted in the directions of the X-, Y-, and Z-axes and the components are joined together, the sleeve 9 is fitted over the joined components, and the filler 11 is introduced between the sleeve 9 and the holders 3, 4. The assembling of the photosemiconductor module is now completed.

The optical connector 5 may be dispensed with, and the optical fiber may be connected directly to the lens holder 4.

With the above first embodiment, the photosemiconductor holder 3 and the lens holder 4 are separate from each other, and held in interfitted engagement with each other. Therefore, when they are assembled together, they can be positionally adjusted relatively to each other easily and freely along the optical axis while their coupled condition are being monitored.

Since the optical connector 5 is constructed of the joint 8 and the receptacle 6, they can be joined by laser beam welding and easily machined with high accuracy since they are made of respective suitable materials.

The flange 4F of the lens holder 4 and the joint 8 as they are superposed are joined to each other by lap laser beam welding. Therefore, the area where the flange 4F and the joint 8 are welded to each other is not adversely affected by different positions in the laser beam may be applied. Consequently, the photosemiconductor module thus produced is of high quality.

The outermost sleeve 9 surrounding the components of the photosemiconductor module conceal the joined regions and protect them for increased environmental resistance. The outer profile of the photosemiconductor module is neat and stable, and can easily be varied into any of various configurations.

In addition, since the components are joined together by laser beam welding, the photosemiconductor module can easily be assembled according to an automatic process.

Figure 4:
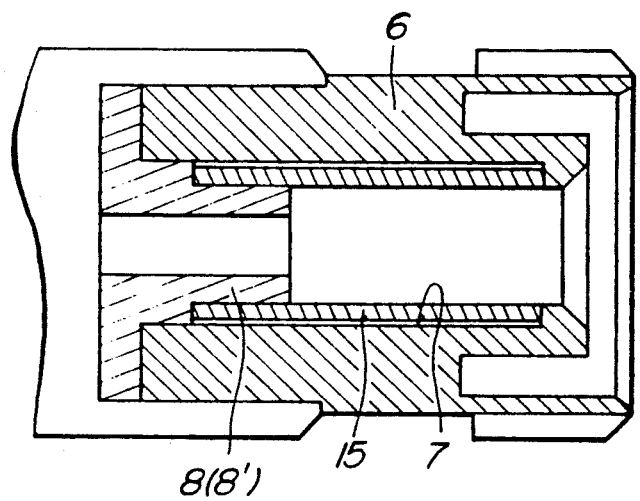
FIG. 4 is an axial cross-sectional view of a modification of the photosemiconductor module according to the first embodiment.

FIG. 4 shows a modification of the photosemiconductor module according to the first embodiment of the present invention. The modified photosemiconductor module shown in FIG. 4 has an axially split sleeve 15 mounted in the ferrule hole 7, with a joint 8, partly fitted in the axially split sleeve 15. The other structural details are the same as those of the photosemiconductor module according to the first embodiment.

A photosemiconductor module according to a second embodiment of the present invention will be described below with reference to FIG. 5. The photosemiconductor module according to the second embodiment includes a light-detecting element such as a photodiode or the like.

Figure 5:
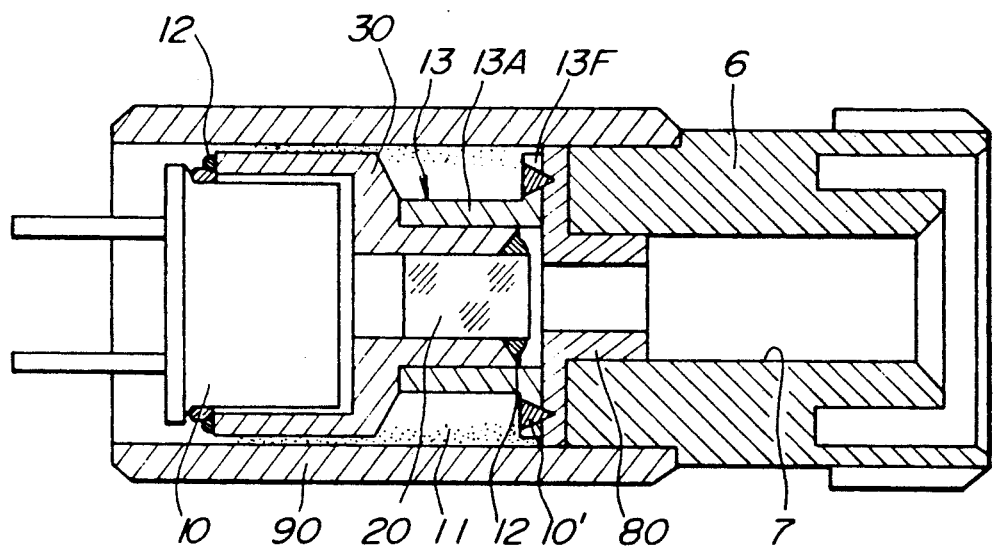
FIG. 5 is an axial cross-sectional view of a photosemiconductor module according to a second embodiment of the present invention.
Figure 6:
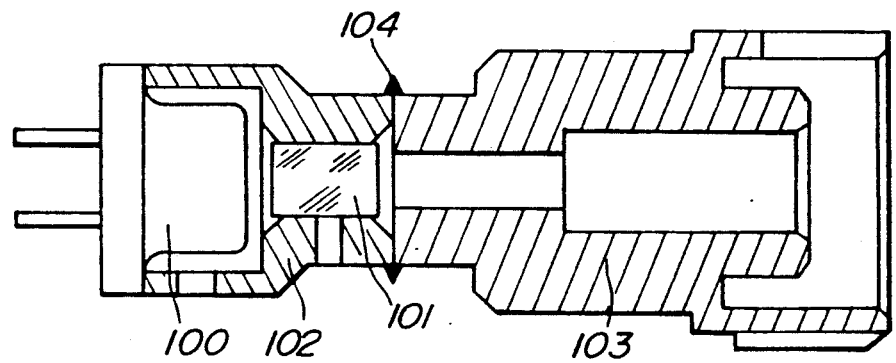
FIG. 6 is an axial cross-sectional view of a conventional photosemiconductor module.

As shown in FIG. 5, the photosemiconductor module comprises a photosemiconductor 10 and a lens 20 which are fixedly mounted in a holder 30 by solder masses 12. The holder 30 is partly press-fitted in a coupling 13 which is held against and superposed on a joint 30 which is partly press-fitted in a ferrule hole 7 defined in a receptacle 6. The coupling 13 is joined to the joint 30 at regions 10, by lap laser beam welding.

The photosemiconductor 10, the holder 30, the coupling 13, the joint 30, and a portion of the receptacle 6 are fitted in and covered with a sleeve 90 which serves as an outer casing. An adhesive filler 11 is filled between the sleeve 90, the holder 30, and the coupling 13.

The photosemiconductor module according to the second embodiment is assembled as follows:

First, the photosemiconductor 10 and the lens 20 with its outer circumferential surface plated with gold are disposed in and fixed to the holder 30 by solder masses 12, thus providing a unitary body. The photosemiconductor 10 in the form of a photodiode has a relatively large light-detecting surface area, and light which is emitted from the optical fiber plug (not shown) connected to the receptacle 6 passes through the lens 20 and is well focused on the light-detecting surface of the photodiode 10. For this reason, the photodiode 10 and the lens 20 are not positionally adjusted relatively to each other along the optical axis, i.e., in the direction of the Z-axis.

Then, the holder 30 with the photodiode 10 and the lens 20 fixedly mounted therein is press-fitted into the coupling 13, which is made of a metallic material such as special stainless steel that can be joined by laser beam welding. As shown in FIG. 5, the coupling 13 comprises a hollow tubular member including a tubular portion 13A in which the holder 30 is press-fitted and a flange 13F to be joined to the joint 80 by laser beam welding.

The joint 80 is press-fitted into the ferrule hole 7 in the receptacle 6. As described above in connection with the first embodiment, the receptacle 6 is complex in shape, and the ferrule hole 7 is required to be finished so that the diameter thereof is defined highly accurately. Therefore, the receptacle 6 is made of a material such as brass which can easily be machined with high precision. The joint 80 to be joined to the coupling 13 by laser beam welding is made of the same material as the coupling 13.

The flange 13F of the coupling 13 is then pressed against and superposed on the joint 80. While the coupled condition of the coupling 13 and the joint 80, i.e., the intensity of light that is transmitted from the joint 80 to the lens 20, is being monitored, the coupling 13 and the joint 80 are positionally adjusted in directions of X- and Y-axes normal to the optical axis. Then, the flange 13F of the coupling 13 and the joint 80 as they are superposed one on the other are joined to each other at the regions 10' by a lap laser beam welding process which is effected axially from the side of the flange 13F to the side of the joint 80.

After the flange 13F and the joint 80 are joined by laser beam welding, the sleeve 90 is fitted over the joined components, and the filler 11 is introduced between the sleeve 90, the holder 30, and the coupling 13. The photosemiconductor module according to the second embodiment is now fully assembled.

With the second embodiment, the components are assembled and secured together by soldering, press-fitting, and laser beam welding. Accordingly, the components are firmly joined together, and highly resistant to structural thermal strain under heat-cycle test, and the photosemiconductor module is highly reliable in operation.

Since the components are put together relatively easily be soldering, press-fitting, and laser beam welding, it is easy to assemble the photosemiconductor module automatically.

The joint 80 which can be joined by laser beam welding is press-fitted into the receptacle 6. The receptacle 6 can be made of a material that can easily be machined with high precision.

In the second embodiment, the receptacle 6 may be dispensed with, and the optical fiber may be connected directly to the holder 30. Furthermore, an axially split sleeve as shown in FIG. 4 may be inserted in the ferrule hole 7.

Figure 7:
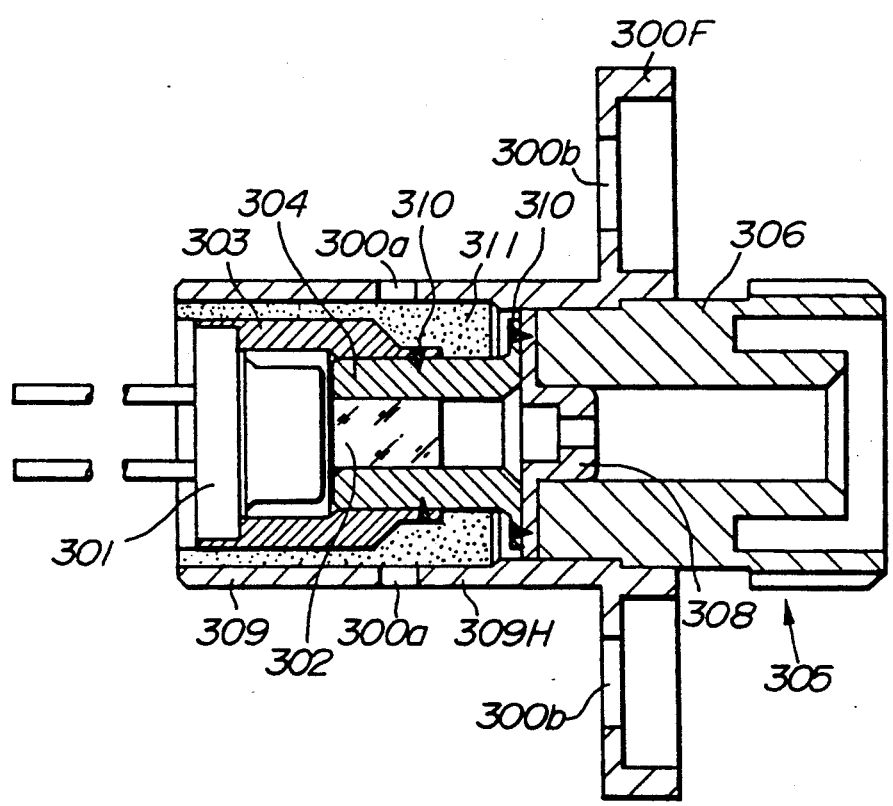
FIG. 7 is an axial cross-sectional view of a photosemiconductor module according to a third embodiment of the present invention.

FIG. 7 shows an axial cross-sectional view of a photosemiconductor module according to a third embodiment of the present invention. This third embodiment of the photosemiconductor module is substantially similar to the structure shown in FIG. 1, but includes a sleeve 309. The sleeve 309 itself includes a hollow portion 309H as well a diametrically expanded flange portion 309F at an end of the hollow portion 309H.

The hollow portion 309H is configured to fit partially over an outer end surface of an optical connector 305. The optical connector 305 includes a receptacle 306 and a joint 308 fitted into the receptacle 306. As the result of that configuration, the sleeve 309 surrounding the components of the photosemiconductor module serves to conceal the joined regions. A plastic adhesive 311 is filled through through-holes 300a between the sleeve 309, the photosemiconductor holder 303 and the lens holder 304. The lens holder 304 is fitted into and joined to the photosemiconductor 303 by laser beam welding 310. The lens holder 304 is joined to the joint 308 also by laser beam welding 310.

Figure 8:
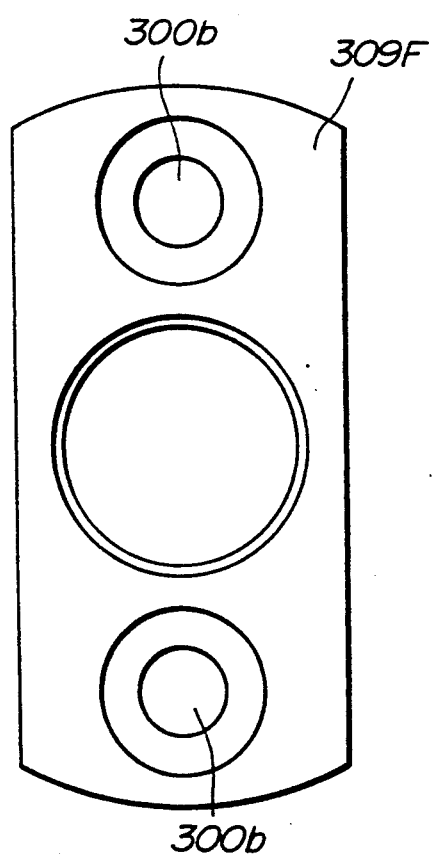
FIG. 8 is a front view of the flange portion of the photosemiconductor module of FIG. 7.

The flange portion 309F of the sleeve 309 is formed, as shown in FIG. 8, into a substantially oblong shape. The flange 309F of the sleeve 309 is used as a coupling for coupling a connector assembly (not shown) which carries an end of the optical fiber and is detachably connected to a receptacle 306 by bolts passing through the through holes 300b in the sleeve 309.

Figure 9:
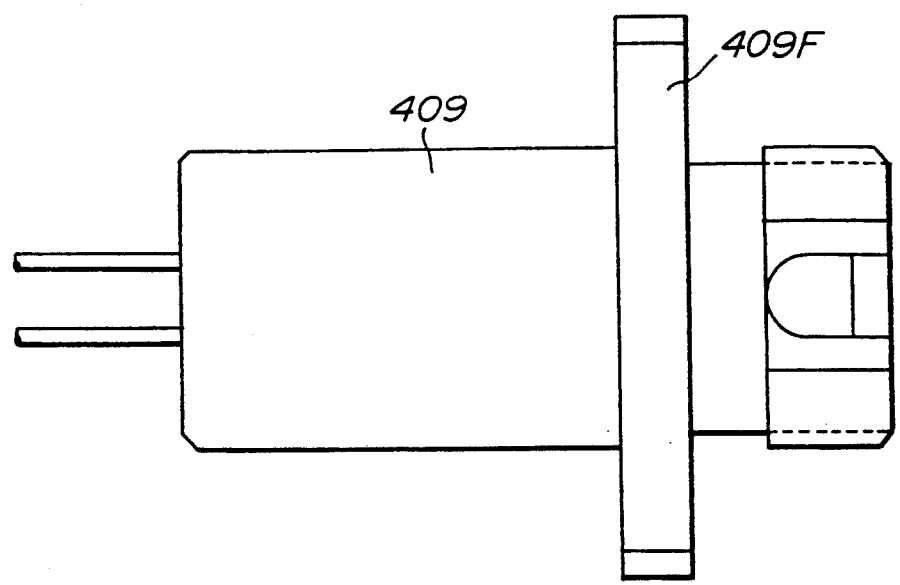
FIG. 9 is an outside view of the photosemiconductor module of FIG. 7 having a modified sleeve.

FIG. 9 is an outside view of the semiconductor module of FIG. 7 having a modified sleeve 409. As shown in FIG. 9, the sleeve 409 includes a square-shaped flange portion 409F.

Figure 10:
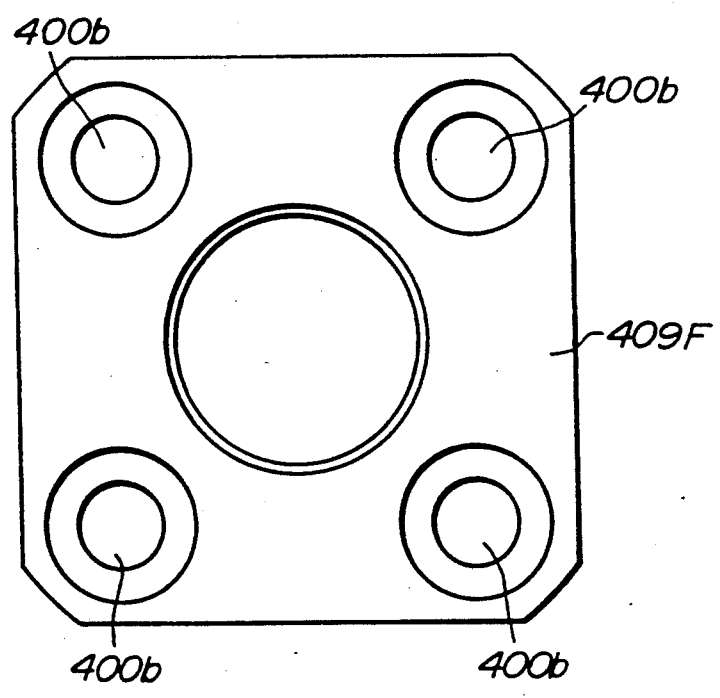
FIG. 10 is a front view of the flange formed as part of the sleeve shown in FIG. 9.

FIG. 10 shows a front view of the flange portion 409F of the modified sleeve 409.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. A photosemiconductor module for being optically coupled to an optical fiber, comprising:
   a holder assembly;
   a photosemiconductor and a lens which are fixedly mounted in said holder assembly coaxially along an optical axis;
   an optical connector joined coaxially to said holder assembly by lap laser beam welding and adapted to be connected to the optical fiber; and
   a sleeve partially fitted over a portion of said optical connector so as to protectively cover at least a portion of said holder assembly and a portion of said optical connector.

2. A photosemiconductor module as claimed in claim 1, wherein said sleeve includes a hollow portion and a flange portion at an end of the hollow portion, said flange portion being adapted to be coupled to a connector assembly having an end of the optical fiber and being detachably connected to said optical connector.

3. A photosemiconductor module as claimed in claim 2, wherein said flange portion includes a substantially oblong-shaped flange.

4. A photosemiconductor module as claimed in claim 2, wherein said flange portion includes a substantially square-shaped flange.

5. A photosemiconductor module as claimed in claim 2, further comprising a filler filled between the hollow portion of said sleeve and said holder assembly.

6. A photosemiconductor module as claimed in claim 1, wherein said holder assembly comprises at least one hollow holder, in which said lens is coaxially fixedly mounted, said hollow holder being made of a material, including stainless steel, which can be joined to said optical connector by lap laser beam welding.

7. A photosemiconductor module for being optically coupled to an optical fiber, comprising:
   a hollow holder in which a photosemiconductor and a glass lens are fixedly coaxially mounted;
   a coupling in which an end portion of said hollow holder is fitted, said coupling having a flange portion at an end thereof;
   said glass lens being disposed between said photosemiconductor and said flange portion of said coupling and being fixedly mounted in said hollow holder by soldering;
   an optical connector adapted to be optically coupled to said optical fiber; and
   said flange portion of said coupling being joined to said optical connector by laser beam welding.

8. A photosemiconductor module as claimed in claim 7, wherein said coupling is made of a material, including stainless steel, which can be joined to said optical connector by lap laser beam welding.

* * * * *